United States Patent [19]
Lagoutte

[11] 3,882,022
[45] May 6, 1975

[54] APPARATUS FOR THE PERMUTATION OF MOVABLE BED FLUIDS

[76] Inventor: Pierre Lagoutte, Carraire du Grand Cabries, Le Tholonet (Bouches-du-Rhone), France

[22] Filed: Apr. 29, 1973

[21] Appl. No.: 353,191

[30] Foreign Application Priority Data
Apr. 20, 1972 France .............................. 72.14938

[52] U.S. Cl. .................. 210/189; 210/33; 210/266
[51] Int. Cl. ............................................ B01d 23/10
[58] Field of Search ........... 210/189, 190, 191, 266, 210/292, 33, 456

[56] References Cited
UNITED STATES PATENTS
| | | | |
|---|---|---|---|
| 3,731,810 | 5/1973 | Wallmuller | 210/189 |
| 3,747,764 | 7/1973 | Graham et al. | 210/189 |

Primary Examiner—Roy Lake
Assistant Examiner—DeWalden W. Jones
Attorney, Agent, or Firm—Sughrue, Rothwell, Mion, Zinn & Macpeak

[57] ABSTRACT

A movable bed water softening apparatus is provided wherein the resins in their regenerated state are supplied into the upper portion of a closed softener tank. The resins pass downwardly through the tank around a centrally disposed water supply pipe and the water passes radially outwardly through the movable bed of resins into a peripheral collector. The spent resins are passed through a regeneration column having a double wall arrangement wherein the spent resin particles are introduced at the top of the column and passed downwardly between the double walls and subsequently pass upwardly through the passage defined by the innermost wall in opposition to a flow of regenerating brine. The regenerated resin is then passed upwardly through a rinsing column and returned to the top of the softener tank.

5 Claims, 2 Drawing Figures

APPARATUS FOR THE PERMUTATION OF MOVABLE BED FLUIDS

The present invention relates to an apparatus of a new type, which uses ion exchange resins in order to effect various chemical coreactions on various liquid or gaseous fluids.

One of the fields of application is the treatment of a water which is crude but previously filtered for the purpose, for instance, of decarbonating it. The apparatus may also consist, by way of another example, of two units in a demineralization line. In this latter instance, the first apparatus is loaded with cationic resins, and followed by a second apparatus loaded with anionic resins.

Among the plainest applications, the softening of a previously filtered water is carried out by using a resin which permutes in a sodium cycle.

It is known that, for softening a hard water, a ion exchange bed is used, which is constituted by small balls of cationic resins in a sodium cycle. The hard water softens while passing through the resin bed. The resins must be regenerated periodically. With the known water softeners, most of times it is necessary to stop the plant from time to time in order to subject the latter to a regeneration treatment for the ion exchange resins.

The object of the present invention is to obviate this drawback by providing a movable bed water softening apparatus, capable of being used without any stoppage periods, while the resins are regenerated through a continuous circulation.

A water softening plant according to the invention is characterized in that it includes three main units, to wit:

1. A tightly closed softener tank, into the upper part of which the resins are poured in their regenerated state, while they are taken off from the lower part of said tank when they are spent, the circulation of the resins taking place thus from top to bottom round a vertical central distributor having a porous wall and inside a peripheral collector, the water to be treated being sent in its crude state to the central distributor to pass radially as horizontal sheets through the thickness of the resin bed before reaching, in a softened state, the peripheral collector, a water flow being provided at the lower part of the softener tank to carry along the spent resins;

2. a regeneration column, which receives the spent resins and regenerates them by mixing them with a counterflowing brine bath, so that regenerated resins come out from the upper part of said column;

3. lastly, a rinsing column, into the lower part of which the resins from the regeneration column flow, and from the upper part of which said resins come out after being rinsed by counterflowing softened water, the resins thus regenerated and rinsed being sent back to the upper part of the softener tank.

According to another feature of the invention, the regeneration column includes an inner double wall, the spent resins being admitted into the upper part of the gap defined by said double wall, so that, to begin with, they go down into said peripheral gap and then, after reaching the bottom of the column, they rise back through the central space of the latter before entering the rinsing column.

According to another additional feature of the invention, a brine pump is provided for pumping brine from a vat and send it to the regeneration column, wherein said brine circulates in a direction opposite to that of the circulating resins, the spent brine being then discharged and to a sewer.

A further feature of the invention consists in providing in the plant a second pump on a by-pass line to take off a portion of the flow of softened water and send it, on the one hand, on the outlet for the spent resins at the bottom of the softener, and, on the other hand, towards the top of the rinsing column wherefrom the water comes out partly with the regenerated and rinsed resins, which are sent back towards the top of the softener tank, and partly towards the sewer.

According to another feature of the invention, the lines sending back the spent brine, on the one hand, and the spent rinsing water, on the other hand, to the sewer, converge towards a proportion controlling apparatus provided to regulate the equilibrium of the respective flows.

According to a further feature, the rinsing column is fitted with a resistivity measuring device for measuring the mean electric resistivity of the products circulating in said column.

According to a further feature, a photo-electric cell is provided at the top of the rinsing column, the switching light ray of said cell passing through the guide column.

The appended drawing, given by way of non-limiting example, will enable the features of the invention to be more clearly understood.

Figure 1:
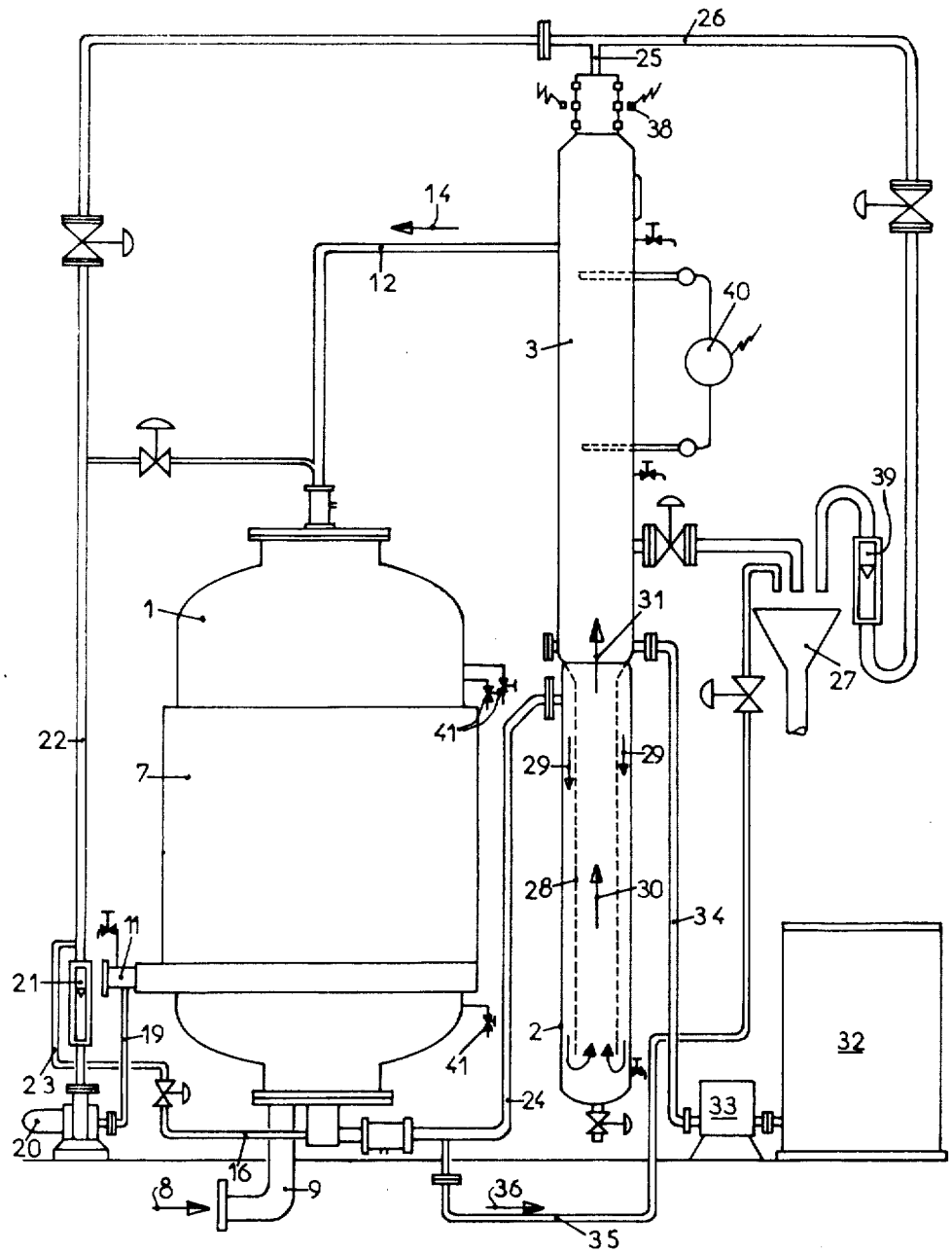
FIG. 1 is a general view of a water softening plant according to the invention.

The plant illustrated in FIG. 1 includes three main units, to wit:

a softener tank 1;
a regeneration column 2;
a rinsing column 3.

The softener tank 1 operates while having being tightly closed. It includes internally a central distributor 4, the wall 5 of which is porous. Around said distributor the wall 6 of the tank 1 is porous as well, and surrounded by a collector 7.

Figure 2:
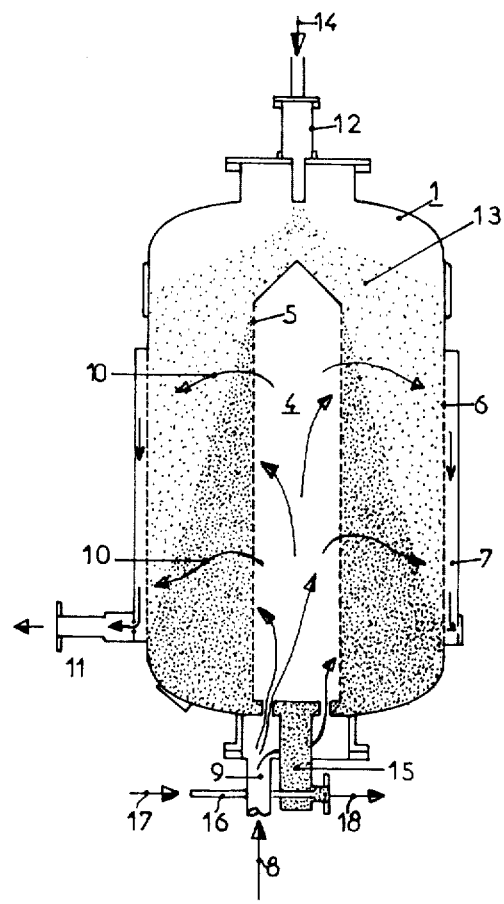
FIG. 2 is an axial section of the softener tank.

The softening of the water is effected through a crossed circulation, according to the diagram illustrated in FIG. 2. Crude water is admitted at the bottom of the tank 1 (arrow 8), the line 9 opening into the distributor 4. This water passes radially, and as horizontal sheets which are mutually superposed (arrows 10), through the resins contained between the porous walls 5 and 6. After passing through said resins, the softened water is collected in the collector 7, from which it is discharged through a line 11.

A line 12 is provided at the upper part of the tank 1, and the regenerated resins 13 (arrow 14) are poured through said line. The resins flow continuously downwards and, when they are spent, they are collected in a line 15 disposed at the bottom of the tank 1. Said line 15 has a nozzle 16 passing therethrough, which sends softened water 17 in order to carry along said resins according to the direction of the arrow 18.

The circulation diagrams are as follows:

The water to be treated is sent in its crude state into the line 9 (FIG. 1, arrow 8). It softens while passing through the resins according to the path illustrated in FIG. 2, and softened water is finally collected in the outlet line 11.

A small flow of softened water is taken from said line 11 by a pipe 19, and sent by a pump 20 to a flow meter 21 at the outlet of which the flow divides itself in two lines 22 and 23. The line 23 opens into the line 16 to carry along the spent resins towards a line 24 which opens into the top of the regeneration column 2.

The line 22 divides itself into two lines, to wit, a line 25 opening into the top of the rinsing column 3, and a return line 26 to the sewer 27.

The regeneration column 2 includes two tubular walls which are concentric, to wit, an outer wall and an inner tubular wall 28. The mixture of spent resins and water is poured at the top of the annular gap which surrounds the tube 28. It goes down then, as indicated by the arrows 29, till the bottom of the column 2 and then goes up again into the central space in the tube 28 (arrow 30). At the upper part of the column 2 the resins are regenerated and enter the bottom of the rinsing column 3 (arrow 31). Brine counterflows inside the regeneration column 2, which brine is taken from a vat 32 by a pump 33. The pump 33 delivers into a line 34. The brine circulates against the stream of resins (that is, in the opposite direction to the arrows 30 et 29) to flow, when spent, through the line 24 from which it is taken again by a line 35 (arrow 36). The line 35 leads to the sewer 27.

The rinsing water coming from the line 25 passes through the light ray of a photo-electric cell 38 which controls the level of the resins, and then comes down into the column 3 till the outlet line 37. The regenerated resins come out of the column 2 (arrow 31), circulate from bottom to top inside the column 3, in a counterflow direction with respect to the rinsing water. After being rinsed, the resins come out through the line 12 (arrow 14) which sends them back into the softener tank 1.

The assembly is completed by a flow meter 39 on the line 26 of spent rinsing water, by an electric resistivity measuring device 40 which works on the rinsed resins in column 3, and by various sampling cocks such as 41.

What is claimed is:

1. An ion exchange plant for softening water comprising:
    a. a softener tank, inlet means on the upper portion of said tank into which resins are supplied in their regenerated state, outlet means for removing the spent resins from the lower part of said tank, the circulation of the resins thus taking place from top to bottom, a vertical central distributor having a porous wall disposed in said tank, peripheral collector means disposed outside said tank opposite said distributor, fluid supply means for supplying a fluid to be treated in its crude state into said central distributor for radially outward passage through the thickness of the resin bed into the peripheral collector, conduit means for supplying a portion of said fluid through the lower part of said softener tank to carry along the spent resins;
    b. a regeneration column for receiving spent resins and regenerating them by contact with a regeneration fluid, means for supplying said regeneration fluid to said regeneration column in a counterflow direction to the spent resins so that the regenerated resins come out of the upper part of said column; and
    c. a rinsing column disposed above said regeneration column for receiving into the lower part thereof the resins coming from the regeneration column, said conduit means supplying a portion of the softened water to the upper portion of said rinsing column whereby the regenerated resins will be rinsed by the counterflowing water, and pipe means for returning the regenerated and rinsed resins from the upper portion of said rinsing column back to the upper portion of said softener tank.

2. An ion exchange plant as set forth in claim 1 wherein the regeneration column includes a pair of concentric cylindrical walls, additional pipe means for supplying spent resins to the upper part of the regeneration column between said walls whereby the spent resins pass downwardly between said walls and upon reaching the bottom of said column pass upwardly through the central space defined by the innermost wall before entering the rinsing column.

3. An ion exchange plant as set forth in claim 1 wherein apparatus is provided for measuring the mean composition of the products which circulate in said rinsing column.

4. An ion exchange plant as set forth in claim 3 wherein said apparatus is comprised of a resistivity measuring device.

5. An ion exchange plant as set forth in claim 1 wherein photo-electric cell means are provided at the top of said rinsing columns to control the resin level in said rinsing column.

* * * * *